United States Patent
Bathe et al.

(10) Patent No.: US 11,887,023 B2
(45) Date of Patent: Jan. 30, 2024

(54) SYSTEMS AND METHODS FOR GENERATING TIME SLOT PREDICTIONS AND REPURCHASE PREDICTIONS USING MACHINE LEARNING ARCHITECTURES

(71) Applicant: Walmart Apollo, LLC, Bentonville, AR (US)

(72) Inventors: Sonal Bathe, Sunnyvale, CA (US); Rahul Sridhar, Santa Clara, CA (US); Sinduja Subramaniam, San Jose, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 243 days.

(21) Appl. No.: 17/163,397

(22) Filed: Jan. 30, 2021

(65) Prior Publication Data
US 2022/0245530 A1   Aug. 4, 2022

(51) Int. Cl.
*G06Q 10/02* (2012.01)
*G06Q 10/1093* (2023.01)
(Continued)

(52) U.S. Cl.
CPC .............. *G06Q 10/02* (2013.01); *G06N 20/00* (2019.01); *G06Q 10/04* (2013.01); *G06Q 10/0836* (2013.01); *G06Q 10/1093* (2013.01)

(58) Field of Classification Search
CPC .................. G06Q 30/0601; G06Q 30/0641
See application file for complete search history.

(56) References Cited

U.S. PATENT DOCUMENTS 7,280,974 B2   10/2007   Blanchard et al.
8,170,915 B2    5/2012   Borders et al.
(Continued)

FOREIGN PATENT DOCUMENTS

WO   WO-2020237020 A1 * 11/2020 ............ G06M 1/272

OTHER PUBLICATIONS

Liu, Cheng-Ju et al.; "Machine learning-based e-commerce platform repurchase customer prediction model"; Published Dec. 3, 2020; PLoS One; pp. 1-34; https://www.ncbi.nlm.nih.gov/pmc/articles/PMC7714352/ (Year: 2020).*

(Continued)

*Primary Examiner* — Emmett K. Walsh
*Assistant Examiner* — Michael C Moroney
(74) *Attorney, Agent, or Firm* — BRYAN CAVE LEIGHTON PAISNER LLP (57) ABSTRACT

Systems and methods including one or more processors and one or more non-transitory storage devices storing computing instructions configured to run on the one or more processors and perform functions comprising: generating one or more feature vectors for a user, the one or more feature vectors at least comprising transaction-based features and slot-based features; generating, using a machine learning architecture, a repurchase prediction for the user based, at least in part, on the one or more feature vectors; generating, using the machine learning architecture, a time slot prediction for the user based, at least in part, on the one or more feature vectors, the time slot prediction predicting a time slot desired by the user for an upcoming transaction; and executing a reservation function that facilitates reserving of the time slot for the user. Other embodiments are disclosed herein.

20 Claims, 6 Drawing Sheets

(51) Int. Cl.
*G06Q 10/0836* (2023.01)
*G06N 20/00* (2019.01)
*G06Q 10/04* (2023.01)

(56) References Cited

U.S. PATENT DOCUMENTS

| | | | |
|---|---|---|---|
| 10,002,322 B1* | 6/2018 | Ravindran | G06Q 30/02 |
| 11,188,940 B1* | 11/2021 | Vanderveld | G06Q 30/0255 |
| 11,625,796 B1* | 4/2023 | Xia | G06Q 30/0202 |
| | | | 705/14.46 |
| 2014/0136443 A1* | 5/2014 | Kinsey, II | G06Q 10/063116 |
| | | | 705/347 |
| 2014/0279208 A1 | 9/2014 | Nickitas et al. | |
| 2017/0046773 A1 | 2/2017 | Hendricks, II et al. | |
| 2018/0012195 A1* | 1/2018 | Nagaraj | G06Q 10/1095 |
| 2019/0095853 A1 | 3/2019 | Kaplan | |
| 2021/0326966 A1* | 10/2021 | DeLuca | G06Q 30/0637 |
| 2021/0334832 A1* | 10/2021 | Walters | G06N 20/00 |
| 2022/0164699 A1* | 5/2022 | Neupane | G06Q 20/405 |

OTHER PUBLICATIONS

Qiu, Jiangtao et al.; "Predicting customer purchase behavior in the e-commerce context"; Published Jun. 30, 2015; Electronic Commerce Research; 15; pp. 1-53; https://link.springer.com/article/10.1007/s10660-015-9191-6 (Year: 2015).*

* cited by examiner

- 401 – Storage Module(s)
  - 330 – Electronic Platform
    - 410 – Database(s)
      - 310 – Items
      - 320 – Historical Data
        - 321 – Transactions
        - 420 – Slot Selection Data
        - 430 – User Engagement Data
    - 360 – Scheduling System
      - 361 – Reservation Functions
        - 465 – Notifications
        - 466 – Automated Reservations
      - 370 – Time Slots
    - 350 – Machine Learning Architecture
      - 351 – Repurchase Predictions
        - 455 – Time Period
      - 451 – Random Forest Decision Tree Model
      - 452 – Logistic Regression Model
      - 453 – Gradient Boosted Tree Model
      - 352 – Time Slot Predictions
      - 460 – Feature Vectors
        - 461 – Transaction-based Features
        - 462 – Slot-based Features

- 402 – Processing Module(s)

610 – Identifying a user that is actively engaged with an electronic platform

620 – Generating one or more feature vectors for the user based, at least in part, on historical data associated with the user 630 – Generating a repurchase prediction for the user based, at least in part, on the one or more feature vectors 640 – Generating a time slot prediction for the user indicating or predicting a time slot desired by the user for an upcoming transaction 650 – Executing a reservation function that facilitates reserving of the time slot for the user

FIG. 6

SYSTEMS AND METHODS FOR GENERATING TIME SLOT PREDICTIONS AND REPURCHASE PREDICTIONS USING MACHINE LEARNING ARCHITECTURES

TECHNICAL FIELD

This disclosure relates to machine learning techniques for predicting future transactions and predicting time slots associated with the transactions.

BACKGROUND

Electronic platforms permit users to place orders for various types of items (e.g., products and/or services). When an order or transaction is placed by the user on an electronic platform, the user may select a time slot indicating a date and time when the items are to be delivered to the user or picked-up by the user (e.g., at a brick-and-mortar location associated with the provider of the electronic platform).

Repetitive ordering patterns are common for orders pertaining to certain item categories. For example, many users regularly place orders for grocery items, household items, and other types of items in order to restock these items. In many cases, the users have strict preferences for particular time slots associated with the delivery and/or pick-up of the items. The ability of an electronic platform to ensure that desired time slots are available for users who routinely place orders can be important to avoid user frustration and churn.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform acts of: generating one or more feature vectors for a user, the one or more feature vectors at least comprising transaction-based features and slot-based features; generating, using a machine learning architecture, a repurchase prediction for the user based, at least in part, on the one or more feature vectors; generating, using the machine learning architecture, a time slot prediction for the user based, at least in part, on the one or more feature vectors, the time slot prediction predicting a time slot desired by the user for an upcoming transaction; and executing a reservation function that facilitates reserving of the time slot for the user.

Figure 1:
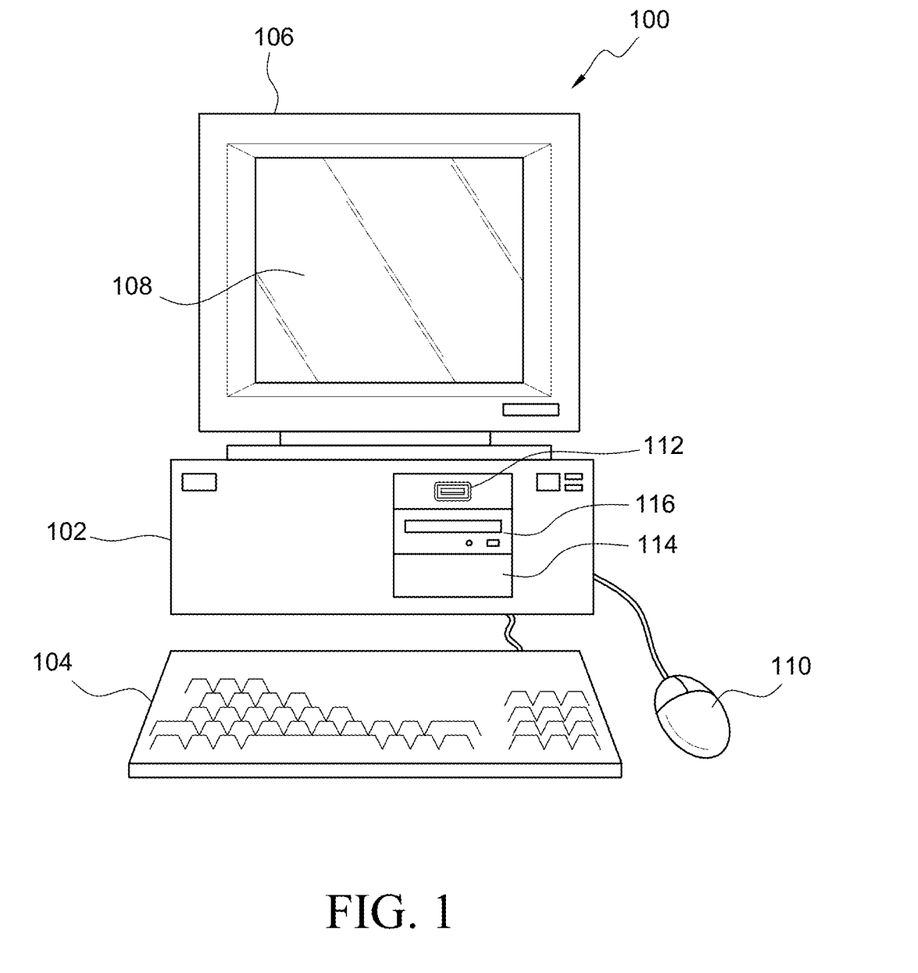
FIG. 1 illustrates a front elevational view of a computer system that is suitable for implementing various embodiments of the systems disclosed in FIGS. 3 and 5.
Figure 2:
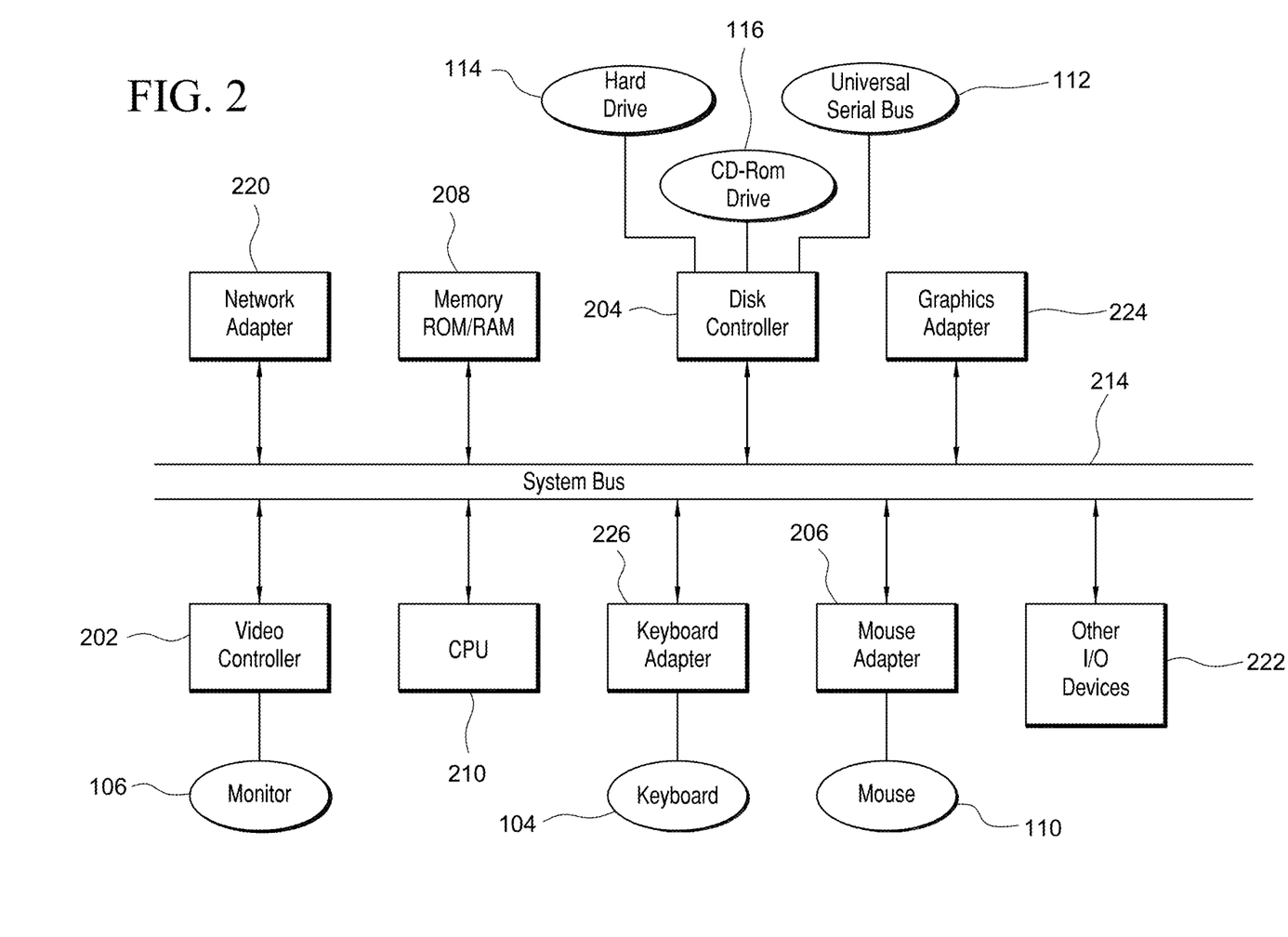
FIG. 2 illustrates a representative block diagram of an example of the elements included in the circuit boards inside a chassis of the computer system of FIG. 1.

Various embodiments include a method. The method can be implemented via execution of computing instructions configured to run at one or more processors and configured to be stored at non-transitory computer-readable media The method can comprise: generating one or more feature vectors for a user, the one or more feature vectors at least comprising transaction-based features and slot-based features; generating, using a machine learning architecture, a repurchase prediction for the user based, at least in part, on the one or more feature vectors; generating, using the machine learning architecture, a time slot prediction for the user based, at least in part, on the one or more feature vectors, the time slot prediction predicting a time slot desired by the user for an upcoming transaction; and executing a reservation function that facilitates reserving of the time slot for the user Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
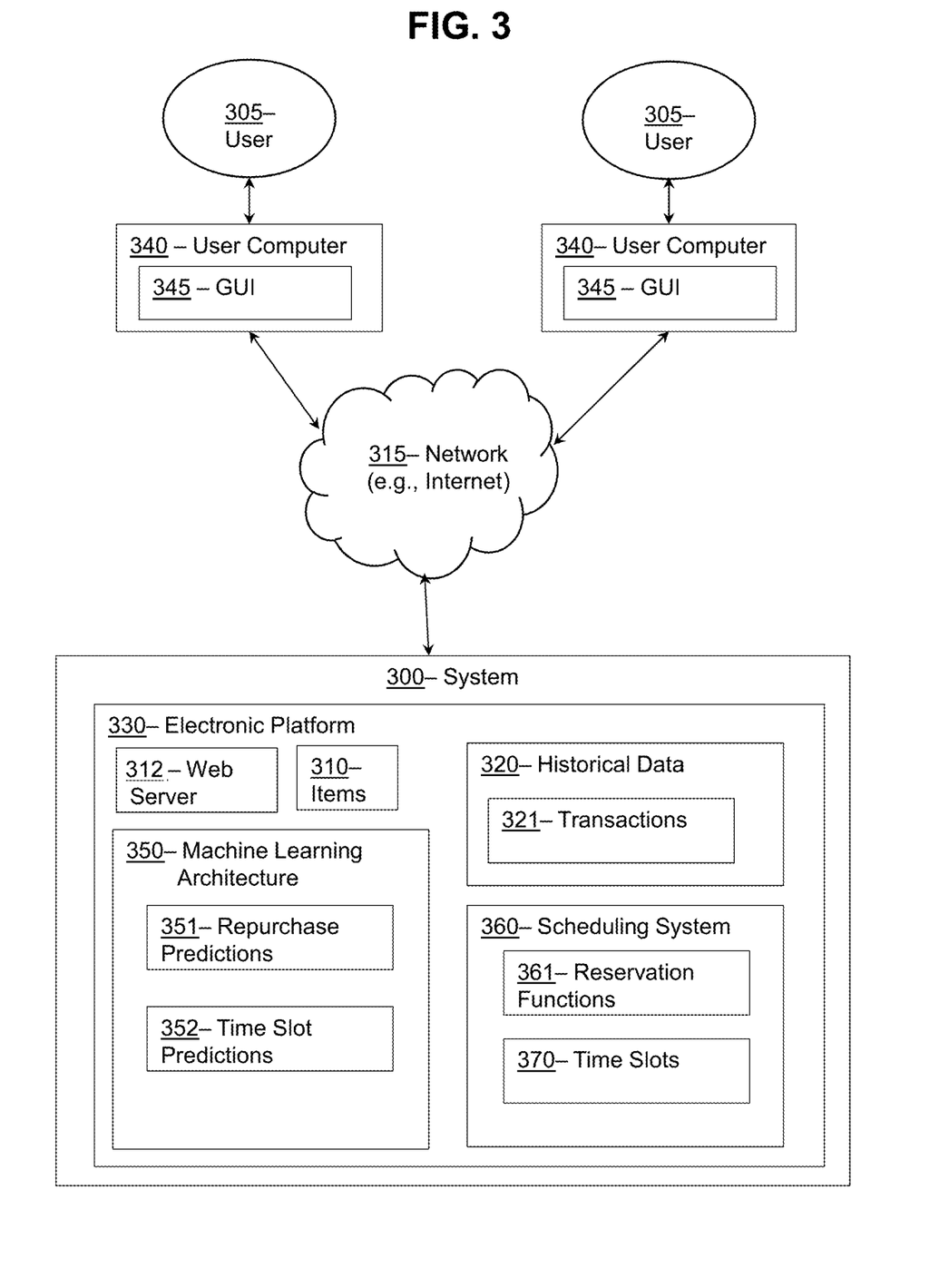
FIG. 3 illustrates a representative block diagram of a system according to certain embodiments.

Turning ahead in the drawings, FIG. 3 illustrates a block diagram of a system 300 that can be employed for generating predictions related to users' repurchase patterns and time slot preferences, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 312, an electronic platform 330, a machine learning architecture 350, and a scheduling system 360. Web server 312, electronic platform 330, machine learning architecture 350, and/or scheduling system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 312, electronic platform 330, machine learning architecture 350, and/or scheduling system 360. Additional details regarding web server 312, electronic platform 330, machine learning architecture 350, and/or scheduling system 360 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, system 300, and/or one or more server computers associated with system 300. In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 312 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 312 can host one or more websites. For example, web server 312 can host an eCommerce website that allows users to browse and/or search for products, to add products to an electronic shopping cart, and/or to purchase products, in addition to other suitable activities.

In many embodiments, web server 312, electronic platform 330, machine learning architecture 350, and/or scheduling system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) associated web server 312, electronic platform 330, machine learning architecture 350, and/or scheduling system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 312, electronic platform 330, machine learning architecture 350, and/or scheduling system 360. In a similar manner, the processing module(s) and the memory storage module(s) can be local and/or remote to each other.

In many embodiments, web server 312, electronic platform 330, machine learning architecture 350, and/or scheduling system 360 can be configured to communicate with one or more user computers 340. In some embodiments, user computers 340 also can be referred to as customer computers. In some embodiments, web server 312, electronic platform 330, machine learning architecture 350, and/or scheduling system 360 can communicate or interface (e.g., interact) with one or more customer computers (such as user computers 340) through a network 315 (e.g., the Internet). Network 315 can be an intranet that is not open to the public. Accordingly, in many embodiments, web server 312, electronic platform 330, machine learning architecture 350, and/or scheduling system 360 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 312, electronic platform 330, machine learning architecture 350, and/or scheduling system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 312, electronic platform 330, machine learning architecture 350, and/or scheduling system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to access interfaces (e.g., GUIs 345) that display details about items 310, add items 310 to a digital shopping cart, and purchase the added items 310. The items 310 made available via the electronic platform 330 may generally relate to any type of product and/or service including, but not limited to, products and/or services associated with groceries, household items, entertainment, furniture, apparel, kitchenware, fashion, appliances, sporting goods, electronics, software, etc.

The electronic platform 330 can be configured to store historical data 320, which records some or all activities involving users' 305 interactions with electronic platform 330 and/or items 310 offered through the electronic platform 330. In certain embodiments, the historical data 320 stored for each user 305 can include information related to transactions 321 conducted by each of the user 305 on the electronic platform 330. Each transaction 321 can relate to one or more items 310 purchased by a user 305. For example, a typical transaction 321 may involve to a user 305 purchasing one or more items 310 via the electronic platform 330 and scheduling the one or more items 310 for pick-up or delivery. In certain embodiments, the transactions 321 conducted by each user 305 and all historical data 320 recorded for the user 305 can be associated with a profile associated with the user 305.

In certain embodiments, when users 305 are conducting transactions 321 (e.g., placing an order for one or more items 310), a scheduling system 360 included on the electronic platform 330 can present users 305 with an interface (e.g., GUI 345) than enables the users 305 to select time slots 370 for delivering the items 310 associated with the transaction 321 and/or picking up items 310 (e.g., at a brick-and-mortar store fronts and/or other locations) associated with the transaction 321. The time slots 370 can correspond to a time window (e.g., a 1-hour time period, 2-hour time period, 6-hour time period, and/or other span of time) on a particular date. The users 305 may select the time slots 370 that are desired for delivery or pick-up of items 310, and the provider of the electronic platform 330 will aim to prepare the items 310 for delivery or pick-up at the specified dates and times associated with the selected time slots 370.

For each user 305, the historical data 320 can include detailed information related to each transaction 321 initiated by the user 305. For example, the electronic platform 330 may store any or all of the following information for each transaction 321 conducted by a user 305: any items 310 that were included in the transaction 321 and/or purchased in connection with the transaction 321; the date and/or time the transaction 321 was scheduled on the electronic platform 330; the total monetary value of the transaction 321 and/or the sale price of each item 310 included in the transaction 321; whether the user selected a pick-up and/or delivery option for the transaction 321; a time slot 370 that was selected for pick-up and/or delivery option; all time slot(s) 370 that were available, but not selected, when the transaction 321 was scheduled; all time slot(s) 370 that were unavailable when the transaction 321 was scheduled; and/or any other information associated with the transaction 321.

The historical data 320 also may store, or may be used to derive, many other parameters pertaining to the users 305 and/or transactions 321 conducted by the users 305. For example, the historical data 320 can be used to determine the frequency at which a user 305 places or conducts transactions 321 on the electronic platform 330, the date and/or time on which the user 305 most recently placed a transaction 321, inter-purchase intervals (IPIs) associated with the user 305 (e.g., indicating the mean and/or median time between transactions 321 conducted by the user 305), the amount of days or time elapsed since the user's 305 most recent purchase, and/or other types of related information.

As explained in further detail below, the electronic platform 330 may include a machine learning architecture 350 that can be configured to analyze the historical data 320 to learn functions for generating various predictions as described herein. In certain embodiments, the machine learning architecture 350 can be configured to generate repurchase predictions 351 that indicate probabilities that users 305 are likely to initiate new transactions 321 within a specified period of time (e.g., within a day, two days, week, two weeks, or a month) and/or probabilities that users 305 will desire to restock items 310 within the specified period of time. The machine learning architecture 350 also can be configured to generate time slot predictions 352 that predict the time slots 370 desired by the users 305 for delivery and/or pick-up options associated with a new or upcoming transaction 321. As explained in further detail below, the machine learning architecture 350 can extract feature vectors from the historical data 320 that can be used to train the machine learning architecture 350 to accurately generate the repurchase predictions 351, time slot predictions 352, and/or other types of predictions.

The machine learning architecture 350 can utilize technical improvements in machine learning technologies to optimize the repurchase predictions 351 and time slot predictions 352 in a manner that increases both satisfaction of users 305 (e.g., by reserving of time slots 370 preferred by the users 305 for pickup and/or delivery at dates/times the users 305 are likely to repurchase items 310) and providers of the electronic platform 330 (e.g., by ensuring customer retention, preventing lost sales, and increasing repurchase rates). For example, in certain embodiments, the machine learning architecture 350 may enhance the generation of the repurchase predictions 351 and time slot predictions 352 by learning user transaction patterns. The learned user transaction patterns can then be used to accurately predict when the users 305 will desire to conduct new transactions 321, and the electronic platform 330 can execute actions (e.g., reservation functions 361) that facilitate easy reordering at desired time slots 370.

The configuration of the machine learning architecture 350 can vary. In certain embodiments, the machine learning architecture 350 can include one or more machine learning models and/or artificial neural networks that are configured to execute deep learning functions, artificial intelligence (AI) functions, and/or machine learning functions to generate the predictions and perform the functions described herein.

As described in further detail below, the machine learning architecture 350 can utilize a random forest decision tree model to learn the user transaction patterns and generate the repurchase predictions 351 and time slot predictions 352. The machine learning architecture 350 can alternatively, or additionally, utilize a logistic regression model and/or gradient boosted tree model to learn the user transaction patterns and generate the repurchase predictions 351 and time slot predictions 352. Exemplary configurations for the random forest decision tree models, logistic regression models, and gradient boosted tree models are described in further detail below. Other types of machine learning models also can be utilized by the machine learning architecture 350 to perform the functions described in this disclosure.

In certain embodiments, the scheduling system 360, which permits time slots 370 to be selected for delivery or pick-up as mentioned above, can be integrated with a digital shopping cart system and/or checkout system. The scheduling system 360 can be configured to initiate one or more reservation functions 361 based, at least in part on the repurchase predictions 351 and/or time slot predictions 352 generated by the machine learning architecture 350.

The reservation functions 361 executed by the scheduling system 360 may vary. In certain embodiments, the reservation functions 361 can be configured to automatically notify users 305 that time slots 370 identified by time slot predictions 352 are available. For example, in response the machine learning architecture 350 determining that a particular user 305 desires to reorder items 310 or place a new transaction 321 in the near future (e.g., based on a repurchase prediction 351 generated for the user 205), the machine learning architecture 350 may generate a time slot prediction 352 predicting a particular time slot 370 that will be desired for the new transaction 321. A reservation function 361 can then be executed which transmits a notification to the user 305, which informs the user 305 that the time slot 370 is available to be reserved. The notification also can include an option or link (e.g., hyperlink) which enables the user to access a GUI 345 to reserve to the time slot 370.

Additionally, in some scenarios, the scheduling system 360 can execute a reservation function 361 which automatically reserves the time slots 370 identified by the time slot predictions 352. In certain embodiments, in response to the scheduling system 360 automatically reserving a time slot 370 for a user 305, the reservation function 361 may send a notification to the user 305 to notify the user 305 that the time slot 370 has been reserved. The notification also can include an option or link (e.g., hyperlink) which enables the user to cancel and change the automated reservation of the time slot 370.

In certain embodiments, the machine learning architecture 350 may generate time slot predictions for multiple time slots 370, each of which indicates the user's affinity or preference for a particular time slot 370. In the event that a time slot 370 identified by a time slot prediction 352 is not available (e.g., because a maximum number of users 305 have already reserved the time slot 370), the machine learning architecture 350 and/or scheduling system 360 may choose another available time slot 370 having the greatest predicted user affinity. The scheduling system 360 may then execute reservation functions 361 to facilitate reserving the available time slot 370 (e.g., for notifying the user of the available time slot 370 and/or automatically reserving the time slot 370).

The machine learning architecture 350 and scheduling system 360 can perform the functions described herein (e.g., related to generating repurchase predictions 351, generating time slot predictions, and executing reservation functions 361) for any of the users 305. In certain embodiments, these functions are only provided to users 305 who are active customers and/or routinely utilize the electronic platform 330 to place transactions 321. For example, in certain embodiments, the machine learning architecture 350 (or other component of the system 300) may initially analyze the historical data 320 to identify a subset of users who routinely and/or regularly utilize the electronic platform 330 and/or who routinely and/or regularly conduct transactions 321 for particular types of items (e.g. groceries and/or household items). The machine learning architecture 350 and scheduling system 360 can receive this list of active users and execute the functions described herein (e.g., related to generating repurchase predictions 351, generating time slot predictions, and executing reservation functions 361) for these users 305.

The techniques described herein for predicting time slot preferences and reserving time slots 370 can be utilized to facilitate repurchasing of any type of item 310 (e.g., items 310 relating to furniture, apparel, kitchenware, fashion, appliances, sporting goods, electronics, software, and/or other types of items 310). In certain embodiments, these techniques may be particularly useful in connection with facilitating the repurchases of items 310 that are routinely ordered and/or restocked by users 305, such as groceries and household items (e.g., paper towels, tissues, toilet paper, toiletries, etc.).

In certain embodiments, in addition to providing functions that enable time slots 370 to be reserved easily and conveniently, the machine learning architecture 350 can be configured to perform other related functions that assist users 305 with repurchasing or reordering items 305.

Figure 4:
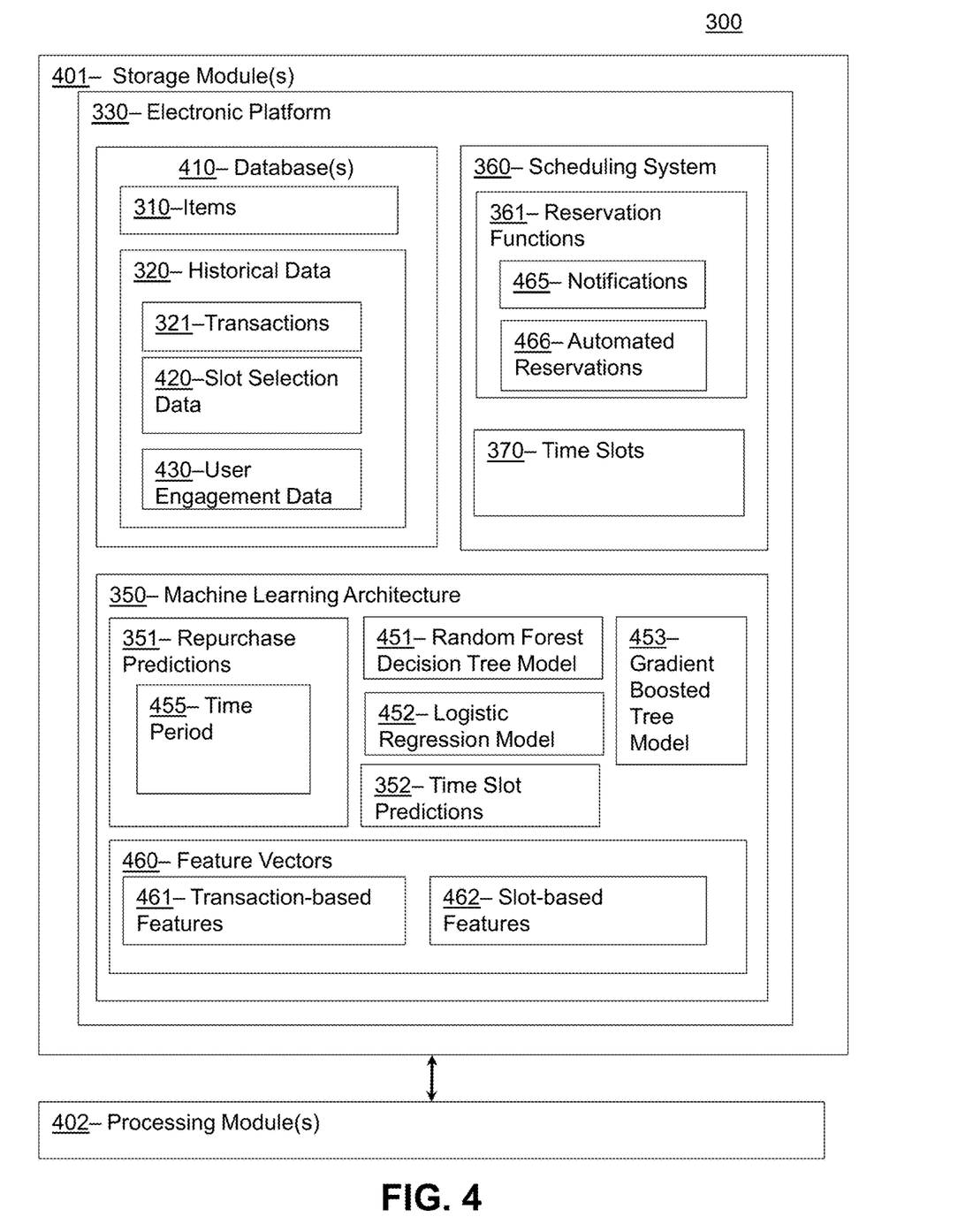
FIG. 4 illustrates a representative block diagram of a portion of the system of FIG. 3 according to certain embodiments.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing an electronic platform 330, machine learning architecture 350 (and associated sub-components), and a scheduling system 360. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, data associated with the item 310 can include any or all of the following: an item name or title, an item category associated with the item, a price, one or more customer ratings for the item, an item description, images corresponding to the item, a number of total sales, and various other data associated with the item.

The one or more databases 410 also may store the historical data 320 which, as mentioned above, can include any data associated with transactions 321 conducted by the users 305. In addition to providing information pertaining to transactions 321 conducted by the users 305, the historical data 320 may include or store slot selection data 420. The slot selection data 420 can include any data associated with time slots 370 selected by the user 305 in connection with previous transactions 321. For example, the slot selection data 420 may indicate dates and/or times that the user selected for scheduling a delivery and/or pick-up. The slot selection data 420 also may indicate the time slots 370 that were available, but not selected, when transactions 321 were scheduled. The slot selection data 420, and other historical data 320, may be utilized by the machine learning architecture 350 to derive user preferences for time slots 370, as described in further detail below.

The historical data 320 also may store, or be used to derive, user engagement data 430. The user engagement data 430 may be used to determine whether or not users are active customers who routinely and/or regularly utilize the electronic platform 330 to place transactions 321 and/or whether or not users are active customers who routinely and/or regularly conduct transaction 321 for particular types of items (e.g. groceries and/or household items). The user engagement data 430 may include various information related to each user's level of engagement with the electronic platform including how frequently the user places transactions 321, the total number of transactions placed by the user, the total number of transactions placed by the user in a previous time period (e.g., past week, month, or year), and/or other information related to a user's level of engagement with the electronic platform 330.

As mentioned above, the machine learning architecture 350 can be configured to generate repurchase predictions 351 and/or time slot predictions 352. In terms of purchasing certain types of items 310 (e.g., groceries and household items), repetitive purchase patterns are common as are the time slots 370 that users prefer to schedule a pick-up or delivery. Indeed, many customers have strict preferences for particular time slots 370 for delivery or pick-up (e.g., based on their work schedule, weekly availability, or consumption habits). An electronic platform 330 that is able to learn user patterns (e.g., for placing transactions and reserving time slots) and execute reservation functions 361 that facilitate easy securing of preferred time slots 370 (e.g., for restocking items 310) can facilitate customer retention and conversion. Conversely, failing to accommodate users 305 with their preferred time slots 370 can result in customer frustration and churn.

To address these and other concerns, the machine learning architecture 350 can be configured to analyze the historical data 320 (including the slot selection data 420) to generate repurchase predictions 351 indicating whether or not the users 305 are likely to place or initiate new transactions 321 within an upcoming time period 455, and time slot predictions 352 indicating the time slots 370 the users 305 will prefer in connection with placing or initiating these transactions 321. The machine learning architecture 350 can utilize various machine learning models to generate these predictions. Exemplary machine learning models can include a random forest decision tree model 451, a logistic regression model 452, and gradient boosted tree model 453. Other machine learning models also may be utilized to generate these predictions.

As mentioned above, the repurchase predictions 352 can predict whether or not each user will conduct a new transaction 321 within a certain time period 455. The time period 455 can vary and may generally include any time period 455. In some cases, the time period 455 can be specified by an administrator or other individual that is associated with the provider of the electronic platform 300. Exemplary time periods 455 can include: one day, two days, three days, one week, and/or one month.

Regardless of which machine learning model is used by the machine learning architecture 350, one or more feature vectors 460 can be derived for each of the users 305 that enable the machine learning architecture 350 to derive the predictions. The feature vectors 460 can include data or information extracted, or derived, from the historical data 320. For example, the feature vectors 460 may include transaction-based features 461 and/or slot-based features 462.

The transaction-based features 461 included in the feature vectors 460 can vary and may include any data associated with users' previous transactions 321. For example, the transaction-based features 461 for a user 305 may indicate any or all of the following: the frequency at which the user 305 conducts transactions 321 on the electronic platform 330; the time and date of the user's 305 most recent transactions 321; inter-purchase intervals (IPIs) indicating the mean and/or median time between transactions 321 conducted by the user 305; the price or value associated with the user's transactions 321 (and/or the mean or median value of the user's transactions 321); the number of days that have lapsed since the user's most recent transaction 321; and/or the number of transactions 321 conducted by the user 305 (e.g., the total number and/or the number of transactions 321 within a specified time frame).

The slot-based features 462 included in the feature vectors 460 can vary and may include any data associated with time slots 370 previously selected by users 305 in connection with previous transactions 321. For example, the slot-based features 462 for a user 305 may indicate any or all of the following: a slot reservation history (e.g., indicating the time slots 370 previously selected by the user 305 for each transaction 321 conducted on the electronic platform 330); slot availability history (e.g., indicating the time slots 370 that were available at the time each transaction 321 was conducted by the user 305 on the electronic platform 330); slot unavailability history (e.g., indicating the time slots 370 that were unavailable at the time each transaction 321 was conducted by the user 305 on the electronic platform 330).

Other relevant features also may be incorporated into the feature vectors 460 for the users 305 including, but not limited to, any other historical data 320 that is useful for generating the repurchase predictions 351 and/or time slot predictions 352. Regardless of which features are included in the feature vectors 460, the feature vectors 460 can be provided as an input to a machine learning model (e.g., such as a random forest decision tree model 451, a logistic regression model 452, and gradient boosted tree model 453) to assist with generating the repurchase predictions 351 and/or time slot predictions 352.

In certain embodiments, the random forest decision tree model 451, logistic regression model 452, and/or gradient boosted tree model 453 can be trained on feature vectors 460 (including the transaction-based features 461 and slot-based features 462) generated from several months of historical data 320 for a large number of users 305 (e.g., thousands or millions of users 305). The performance of these models can be evaluated based on the purchases of the same set of users 305 in a subsequent time period (e.g., k days or weeks) following the several months of data used for training. The performance of these models can be evaluated against different frequency and recency-based baseline heuristics, e.g., which may indicate the most frequent time slot 370 chosen by the users 305 in the historical data 320 and the most recent time slot 370 chosen by the users 305.

Figure 5:
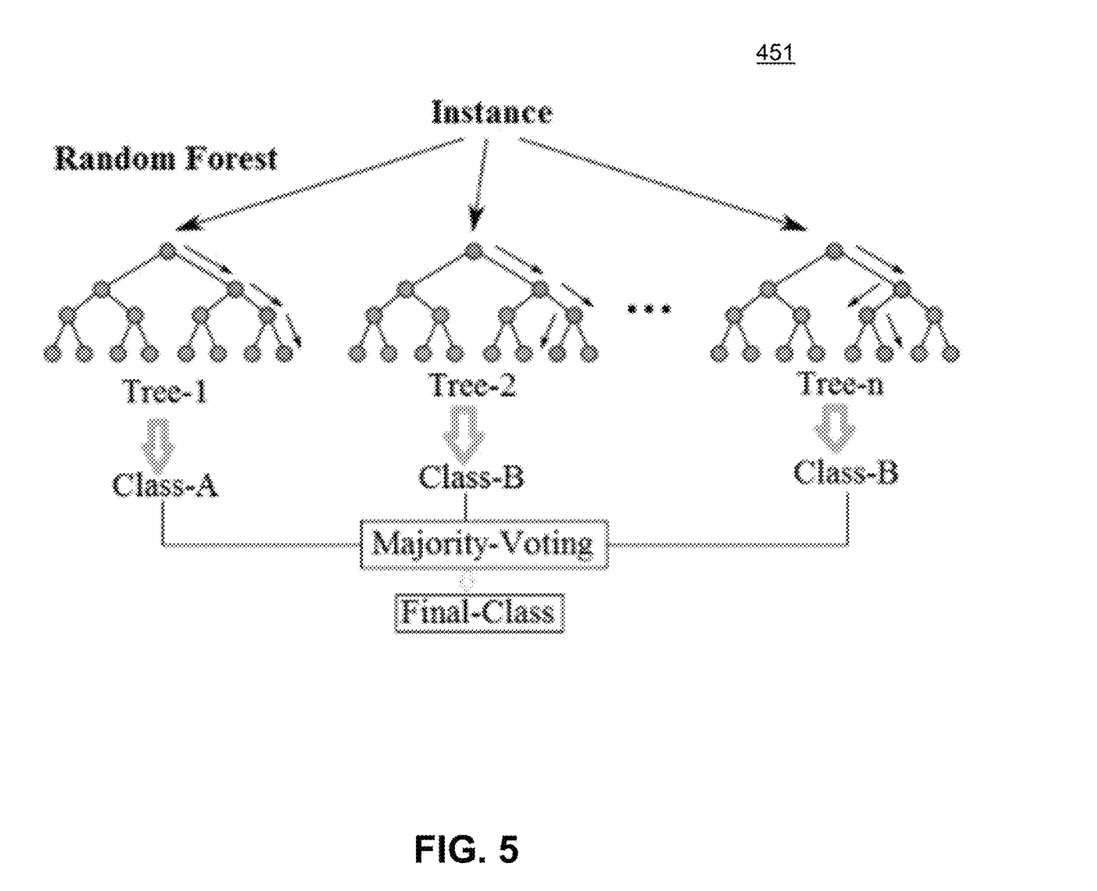
FIG. 5 illustrates a diagram for a random forest decision tree according to certain embodiments.

FIG. 5 illustrates a graphical diagram of an exemplary random forest decision tree model 451. The random forest decision tree model 451 can incorporate an ensemble of n weak classifiers that are configured to output the probability of a user or customer repurchasing within the next k days, wherein n and k can represent any integer. The prediction for a new sample X (e.g., which may include the feature vector associated with a user) is obtained by taking the majority vote of the n predictions from n trees. Each leaf corresponding to X contains the majority vote of the labels from the training samples which belong to that leaf. To generate the repurchase predictions for users, the random forest decision tree model 451 may utilize the following equations:

$$E(S) = \Sigma_{i=1}^{c} -P_i \log_2 P_i \qquad (1)$$

$$IG(Y,X) = E(Y) - E(Y|X) \qquad (2)$$

wherein:
E(S) represents the entropy of sample S;
c represents the number of classes;
$P_i$ is the frequentist probability of an element/class 'i';
IG(Y,X) is the information gain from X on Y where Y is the label (whether the customer will purchase within the next k days) and X is each individual feature;
E(Y) represents entropy of Y; and
E(Y|X) represents entropy of Y given an additional piece of information X.

In certain embodiments, the random forest decision tree model 451 can be configured for multi-class prediction using random forests. Unlike a binary prediction problem such as the purchase prediction model above (e.g., which predicts whether or not the user will purchase in the next k days in a binary fashion), the random forest decision tree model 451 can be configured to address a multi-class problem that chooses between multiple outcomes or classes to generate time slot predictions. In this scenario, each time slot (e.g., 1-2 PM on Date 1, 2-3 PM on Date 1, etc.) may represent a class. The same or similar historical data and feature vectors described above may be used to train the model and to generate the time slot predictions. For example, exemplary feature vectors that are used to train the model can include slot-based features indicating any or of the following features: a number of times each time slot was chosen; number of times each time slot was chosen as a ratio of total number of orders; the last time or occurrence each time slot was chosen; whether a user prefers time slots on weekends or weekdays; and/or whether the user prefers a morning or evening time slot.

Referring back to FIG. 4, the machine learning architecture 350 can additionally, or alternatively, utilize a logistic regression model 451 to generate the repurchase predictions 351 and/or time slot predictions 352. The logistic regression model 451 can utilize a statistical modeling algorithm to model the probability of an event with binary outcomes. For example, with respect to generating the repurchase predictions 351, the logistic regression model 451 can be configured to output the probability of a user repurchasing items 310 and/or initiating a new transaction 321 within the next k days using the following equation:

$$\text{probability(purchase)} = \frac{1}{(1 + \exp(-(\overline{W} * \overline{X}^T)))} \quad (3)$$

wherein:
X is a feature vector comprising transaction-based features and slot-based features;
W is a weight vector that includes a list of weights learnt by the model for each of the features included in the feature vector X;
T represents transpose (i.e., transpose of feature vector X); and exp( ) represents natural exponential function (i.e. $\exp(-(\overline{W} * \overline{X}^T)) \exp^{-(\overline{W} * \overline{X}^T)}$).

The machine learning architecture 350 can additionally, or alternatively, utilize a gradient boosted tree model 453 to generate the repurchase predictions 351 and/or time slot predictions 352. The gradient boosted tree model 453 can include an ensemble of weak classifiers and may be implemented with decision trees in some cases.

During training, the gradient boosted tree model 453 receives the feature vector 460 for the users and corresponding labels y, and learns a sequence of K decision trees via a boosting method. The parameters of the gradient boosted tree model 453, which include tree depth and K number of decision trees, can be declared at the beginning of the training process. During inference, prediction ŷ of each individual tree i in an ensemble of size K is computed based on the feature vector 460. In this algorithm, the predictions can be updated such that the sum of our residuals is close to 0 (or minimum) and predicted values are sufficiently close to the actual values. The gradient boosted tree model 453 can use multiple weak learners to reduce the prediction error before it outputs the class for the repurchase predictions 351 indicating whether the customer will purchase in the next k days.

In certain embodiments, the output of the gradient boosted tree model 453 can include a repurchase prediction 351 that indicates the probability and/or likelihood that each user will repurchase items and/or place a new transaction 321 in the next k days. The output can be a value between 0 and 1. The gradient boosted tree model 453 can then learn thresholds for the probabilities based on the distribution of the users and their transactions with the goal of maximizing the confidence in the predictions. The particular threshold chosen can vary, but can include any number between 0 and 1 that reflects whether users are likely to repurchase in the next k days. In some exemplary cases, the threshold may be set to 0.5, 0.7, 0.8, or 0.9.

As explained above, the random forest decision tree model 451 can be configured for multi-class prediction to generate the time slot predictions 352. The machine learning architecture 350 may additionally, or alternatively, use a heuristics approach to generate the time slot predictions 352. For each user, the heuristics approach can identify a frequency parameter (e.g., indicating the most frequent slot chosen by the user based on the historical data 320 stored for the user) and a recency parameter (e.g., indicating the most recent time slot chosen by the user based on the historical data 320 stored for user). These parameters may then be used as baselines to generate the time slot predictions 352.

Other techniques also may be executed by the machine learning architecture 350 to generate the repurchase predictions 351 and/or time slot predictions 352 described herein.

Regardless of how the repurchase predictions 351 and/or time slot predictions 352 are generated, the scheduling system 360 can execute one or more reservation functions 361 that assist users with reserving preferred time slots 370. In certain embodiments, the repurchase predictions 351 and/or time slot predictions 352 are only generated for active users who are predicted to place an upcoming transaction 321 (e.g., for restocking items).

One exemplary reservation function 361 can include automatically transmitting notifications 465 that notify the users that their preferred time slots 370 are available. The notifications 465 also may include links to interfaces provided by the scheduling system 360 that enable the users to reserve the suggested time slots 370 and/or to select other time slots 370.

Another exemplary reservation function 361 can include scheduling automated reservations 466 for the users. An automated reservation 466 may correspond to a time slot 370 that was automatically reserved for a user based on a time slot prediction 352 generated by the machine learning architecture 350. The automated reservations 466 can be scheduled without requiring any selections to be made by the users.

In certain embodiments, the scheduling system 360 selects which reservation functions 361 to execute based on activity patterns and/or engagement levels of the users. For example, the electronic platform 330 (e.g., the machine learning architecture 350, scheduling system 360, or other component thereof) may initially analyze the user engagement data 430 to determine each users' level of engagement with the electronic platform 330. This may include analyzing how frequently each user places transactions 321 on the electronic platform 330 and/or places transactions 321 for items included in particular item categories (e.g., groceries, household items, etc.).

In certain embodiments, the users may generally be divided into three categories based on their level of engagement with the electronic platform 330: a) unengaged (e.g., identifying users with the lowest levels of engagement with electronic platform 330), engaged (e.g., identifying users who routinely or regularly engage the electronic platform 330), and super-engaged (e.g., identifying users with the greatest level of engagement with the electronic platform 330). In some cases, the time slot predictions 352 may only be generated for the users who are determined to be engaged and super-engaged. Likewise, the scheduling system 360 may only execute reservation functions 361 for the users who are determined to be engaged and super-engaged.

In certain embodiments, different reservation functions 361 may be executed for users based on whether the users are determined to be engaged and super-engaged. For example, for users determined to be super-engaged, the scheduling system 360 may schedule automated reservations 466 to ensure that their preferred time slots 370 are reserved. For users determined to be engaged, the scheduling system 360 may transmit notifications 465 that notify the users about one or more preferred time slots that are available to reserve.

Figure 6:
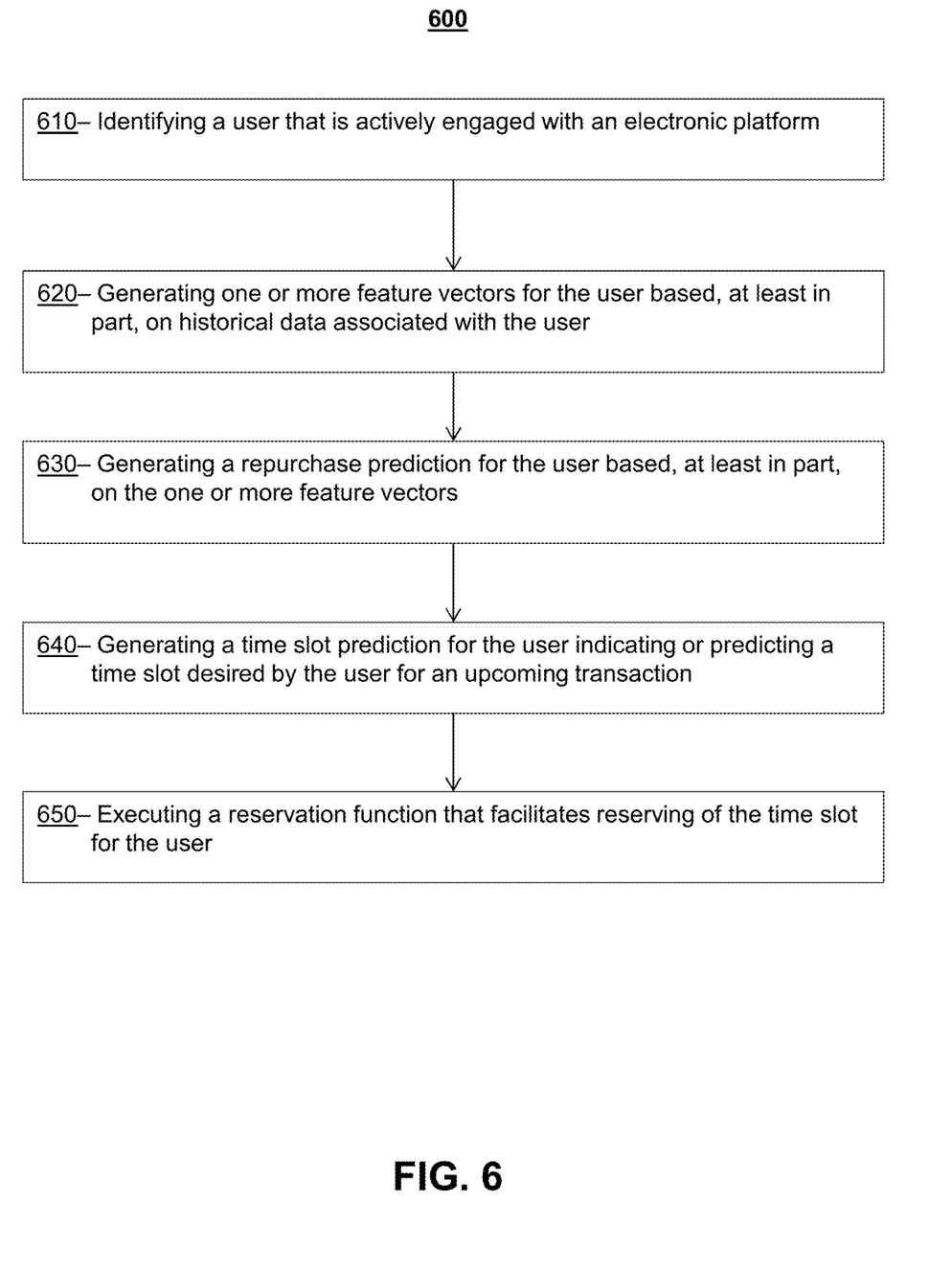
FIG. 6 illustrates a flowchart for a method according to certain embodiments.

FIG. 6 illustrates a flow chart for an exemplary method 600, according to certain embodiments. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIGS. 3-4), machine learning architecture 350 (FIGS. 3-4), electronic platform 330 (FIGS. 3-4), and/or scheduling system 360 (FIGS. 3-4) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as system 300 (FIGS. 3-4), machine learning architecture 350 (FIGS. 3-4), electronic platform 330 (FIGS. 3-4), and/or scheduling system 360 (FIGS. 3-4). The processing module(s) can be similar or identical to the processing module(s) described above with respect to computer system 100 (FIG. 1).

In many embodiments, method 600 can comprise an activity 610 of identifying user as being actively engaged with an electronic platform. In certain embodiments, this may involve analyzing user engagement data associated with the user to determine if the user regularly and/or routinely places transactions through the electronic platform.

Method 600 can further comprise an activity 620 of generating one or more feature vectors for the user based, at least in part, on historical data associated with the user. The feature vectors may include transaction-based features and/or slot-based features that are extracted or derived from the historical data associated with the user.

Method 600 can further comprise an activity 630 of generating a repurchase prediction for the user based, at least in part, on the one or more feature vectors. The repurchase prediction may predict a likelihood or probability that the user will place a new transaction (or desire to place a new transaction) in an upcoming time period (e.g., within the next day or week). In certain embodiments, the repurchase prediction may be generated by a machine learning architecture that comprises a random forest decision tree model, a logistic regression model, a gradient boosted tree model, and/or other learning model.

Method 600 can further comprise an activity 640 of generating a time slot prediction for the user indicating or predicting a time slot desired by the user for an upcoming transaction. The time slot prediction may be generated by a machine learning architecture that comprises a random forest decision tree model, a logistic regression model, a gradient boosted tree model, and/or other learning model. The learning model used to generate the time slot prediction can be the same or similar model used to generate the repurchase prediction, or may be a separate learning model. In certain embodiments, the time slot prediction is generated in response to the repurchase prediction indicating a likelihood or probability above a certain threshold (e.g., 0.5 or 0.9). The time slot generated by the time slot prediction can include both a date and a time or only a time.

Method 600 can further comprise an activity 650 of executing a reservation function that facilitates reserving of the time slot for the user. One exemplary reservation function can include initiating an automated reservation that reserves the time slot for the user automatically without requiring any selections or feedback to be received for the user. Another exemplary reservation function can include transmitting a notification to the user that identifies the availability of the time slot identified by the time slot prediction.

As evidenced by the disclosure herein, the techniques set forth in this disclosure are rooted in computer technologies that overcome existing problems in known prediction systems, specifically problems dealing with providing accurate predictions for predicting if users are likely to place a transaction and time slots desired by the users for placing the transaction. The techniques described in this disclosure provide a technical solution (e.g., one that utilizes various machine learning techniques) for overcoming the limitations associated with known techniques. For example, the prediction techniques described herein take advantage of novel machine learning techniques to learn functions for generating, inter alia, repurchase predictions, time slot predictions, and/or other predictions described herein. This technology-based solution marks an improvement over existing capabilities and functionalities related to computer systems by improving the accuracy and quality of the predictions.

In certain embodiments, the techniques described herein can advantageously improve user experiences with electronic platforms by quickly generating predictions with high accuracy that enable time slots to be automatically and easily reserved. In various embodiments, the techniques described herein can be executed dynamically in real time by an electronic platform. In many embodiments, the techniques described herein can be used continuously at a scale that cannot be reasonably performed using manual techniques or the human mind (e.g., due to the large numbers of customers, large quantity of features that are extracted from historical data for each of the customer, and complex operations executed by the machine learning architecture). The data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 6 may include different procedures, processes, and/or activities and may be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable storage devices storing computing instructions, that when executed on the one or more processors, cause the one or more processors to perform operations comprising:
   generating one or more feature vectors for a user, the one or more feature vectors at least comprising transaction-based features and slot-based features;
   generating, using a first machine learning model of a machine learning architecture, a first output comprising a repurchase prediction for the user based, at least in part, on the one or more feature vectors to learn transaction patterns of the user;
   generating, using a second machine learning model of the machine learning architecture and using respective data of the repurchase prediction for the user, a second output comprising a time slot prediction for the user based, at least in part, on the one or more feature vectors, wherein the time slot prediction predicts a time slot desired by the user for an upcoming transaction, wherein the first machine learning model is performed independently from the second machine learning model, wherein the machine learning architecture comprises the first machine learning model and the second machine learning model, and wherein the machine learning architecture further comprises one or more artificial neural networks configured to execute the first machine learning model or the second machine learning model based on the transaction patterns of the user;
   initiating one or more reservation functions based at least in part on a combination of the first output and the second output to transmit an option to the user that enables the user to access a graphical user interface (GUI) to reserve a reservation function of the one or more reservation functions;
   integrating the reservation function with a digital shopping cart system to create the upcoming transaction based on the repurchase prediction and the time slot prediction previously generated by the machine learning architecture; and
   executing the reservation function that facilitates reserving of the time slot for the upcoming transaction for the user.

2. The system of claim 1, wherein:
   the repurchase prediction estimates a probability that the user repurchases one or more items or conducts a transaction on an electronic platform within a time period; and
   the time slot prediction is generated in response to the repurchase prediction indicating the user is likely to repurchase the one or more items or conduct the transaction on the electronic platform within the time period.

3. The system of claim 2, wherein the machine learning architecture further comprises a random forest decision tree model that is configured to generate at least one of:
   the repurchase prediction; or
   the time slot prediction for the user.

4. The system of claim 2, wherein the machine learning architecture further comprises a logistic regression model or gradient boosted tree model configured to generate at least one of:
   the repurchase prediction; or
   the time slot prediction.

5. The system of claim 1, wherein the reservation function is configured to automatically reserve the time slot for the user.

6. The system of claim 1, wherein the reservation function is configured to transmit a notification to the user which notifies the user that the time slot is available.

7. The system of claim 1, wherein:
   the transaction-based features are extracted or derived from historical data about the user; and
   the transaction-based features include features associated with previous transactions of the user.

8. The system of claim 1, wherein:
   the slot-based features are extracted or derived from historical data about the user; and
   the slot-based features include features associated with one or more time slots that were previously selected by the user in connection with previous transactions.

9. The system of claim 1, wherein the machine learning architecture is integrated or communicates with an electronic platform that offers items over a network.

10. The system of claim 1, wherein the computing instructions when executed on the one or more processors, further cause the one or more processors to perform operations comprising:
    configuring the machine learning architecture to increase accuracy of machine learning model predictions by using historical data of the user by tracking at least one of:
    a frequency of the user conducting transactions;
    a date or a time the user conducted a transaction on an electronic platform;
    inter-purchase intervals (IPIs) associated with the user comprising a median time between IPIs conducted by the user; or
    a number of days that elapsed since a most-recent transaction of the user;
    training the machine learning architecture using the historical data, wherein the historical data is based on extracted feature vectors, wherein the extracted feature vectors comprise the transaction-based features and the slot-based features over a period of time;

analyzing user engagement data to identify users who regularly conduct transactions on the electronic platform; and selecting the user based on the user engagement data associated with the user.

11. A method implemented via execution of computing instructions configured to run at one or more processors and configured to be stored at non-transitory computer-readable media, the method comprising:

generating one or more feature vectors for a user, the one or more feature vectors at least comprising transaction-based features and slot-based features;

generating, using a first machine learning model of a machine learning architecture, a first output comprising a repurchase prediction for the user based, at least in part, on the one or more feature vectors to learn transaction patterns of the user;

generating, using a second machine learning model of the machine learning architecture and using respective data of the repurchase prediction for the user, a second output comprising a time slot prediction for the user based, at least in part, on the one or more feature vectors, wherein the time slot prediction predicts a time slot desired by the user for an upcoming transaction, wherein the first machine learning model is performed independently from the second machine learning model, wherein the machine learning architecture comprises the first machine learning model and the second machine learning model, and wherein the machine learning architecture further comprises one or more artificial neural networks configured to execute the first machine learning model or the second machine learning model based on the transaction patterns of the user;

initiating one or more reservation functions based at least in part on a combination of the first output and the second output to transmit an option to the user that enables the user to access a graphical user interface (GUI) to reserve a reservation function of the one or more reservation functions;

integrating the reservation function with a digital shopping cart system to create the upcoming transaction based on the repurchase prediction and the time slot prediction previously generated by the machine learning architecture; and executing the reservation function that facilitates reserving of the time slot for the upcoming transaction for the user.

12. The method of claim 11, wherein:

the repurchase prediction estimates a probability that the user repurchases one or more items or conducts a transaction on an electronic platform within a time period; and the time slot prediction is generated in response to the repurchase prediction indicating the user is likely to repurchase the one or more items or conduct the transaction on the electronic platform within the time period.

13. The method of claim 12, wherein the machine learning architecture further comprises a random forest decision tree model that is configured to generate at least one of:

the repurchase prediction; or the time slot prediction for the user.

14. The method of claim 12, wherein the machine learning architecture further comprises a logistic regression model or gradient boosted tree model configured to generate at least one of:

the repurchase prediction; or the time slot prediction.

15. The method of claim 11, wherein the reservation function is configured to automatically reserve the time slot for the user.

16. The method of claim 11, wherein the reservation function is configured to transmit a notification to the user which notifies the user that the time slot is available.

17. The method of claim 11, wherein:

the transaction-based features are extracted or derived from historical data about the user; and the transaction-based features include features associated with previous transactions of the user.

18. The method of claim 11, wherein:

the slot-based features are extracted or derived from historical data about the user; and the slot-based features include features associated with one or more time slots that were previously selected by the user in connection with previous transactions.

19. The method of claim 11, wherein the machine learning architecture is integrated or communicates with an electronic platform that offers items over a network.

20. The method of claim 11, further comprising:

configuring the machine learning architecture to increase accuracy of machine learning model predictions by using historical data of the user by tracking at least one of:

a frequency of the user conducting transactions;

a date or a time the user conducted a transaction on an electronic platform;

inter-purchase intervals (IPIs) associated with the user comprising a median time between IPIs conducted by the user; or a number of days that elapsed since a most-recent transaction of the user;

training the machine learning architecture using the historical data, wherein the historical data is based on extracted feature vectors, wherein the extracted feature vectors comprise the transaction-based features and the slot-based features over a period of time;

analyzing user engagement data to identify users who regularly conduct transactions on the electronic platform; and selecting the user based on the user engagement data associated with the user.

* * * * *